(12) United States Patent
Teng et al.

(10) Patent No.: US 12,151,266 B1
(45) Date of Patent: Nov. 26, 2024

(54) METHOD AND DEVICE OF AUTOMATICALLY SELECTING BEANS

(71) Applicant: Lighttells Corp., Ltd., Zhubei (TW)

(72) Inventors: Yen Chu Teng, Zhubei (TW); Meng Fang Yu, Zhubei (TW); Chia-Chung Chen, Zhubei (TW)

(73) Assignee: LIGHTTELLS CORP., LTD., Zhubei (TW)

( * ) Notice: Subject to any disclaimer, the term of this patent is extended or adjusted under 35 U.S.C. 154(b) by 0 days.

(21) Appl. No.: 18/523,154

(22) Filed: Nov. 29, 2023

(30) Foreign Application Priority Data

May 22, 2023 (TW) ................................. 112118984

(51) Int. Cl.
*B07C 5/342* (2006.01)
*G06V 20/68* (2022.01)

(52) U.S. Cl.
CPC ............ *B07C 5/3425* (2013.01); *G06V 20/68* (2022.01)

(58) Field of Classification Search
CPC ...... G06V 20/68; B07C 5/342; B07C 5/3425; B07C 5/363; B07C 5/367; B07C 5/368; B65G 15/02; B65G 29/00; B65G 47/02; B65G 47/04; B65G 47/08; B65G 47/082
USPC ........................................................ 209/576
See application file for complete search history.

(56) References Cited

U.S. PATENT DOCUMENTS

| 3,301,068 | A | * | 1/1967 | Baalsrud | .............. | B65G 47/248 |
| | | | | | | 73/866 |
| 2020/0360969 | A1 | * | 11/2020 | Lien | .................... | G06F 18/2413 |

FOREIGN PATENT DOCUMENTS

TW M597400 U * 6/2020

* cited by examiner

*Primary Examiner* — Michael McCullough
*Assistant Examiner* — Jessica L Burkman
(74) *Attorney, Agent, or Firm* — MUNCY, GEISSLER, OLDS & LOWE, P.C.

(57) ABSTRACT

A method of automatically selecting beans includes dispersing a plurality of beans on at least a first and a second parallel rows on a motion plane; capturing images of a first part of the beans on the first and second rows; capturing images of a second part of the beans on the first and second rows; determining a plurality of appearance features of the beans; removing the beans with the first appearance feature on the first row; collecting the beans without the first appearance on the first row; removing the beans with the first appearance feature on the second row; and collecting the beans without the first appearance on the second row. The timing of removing the beans with the first appearance feature is related to the motion speed of the motion plane and the positions for capturing the images of the first or second part of the beans.

17 Claims, 6 Drawing Sheets

METHOD AND DEVICE OF AUTOMATICALLY SELECTING BEANS

TECHNICAL FIELD

The present invention relates to an automatically selecting method and device, especially to a method and device of automatically selecting beans.

BACKGROUND

Modern people like to drink coffee, and the coffee flavor depends on the quality and roasting degree of coffee beans. The quality of coffee must be examined. The quality and size of coffee beans are usually identified and classified one by one by human eyes, but this way is time-consuming and labor-intensive when the number of coffee beans to be identified becomes large. Therefore, this application aims to pick out good and bad coffee beans quickly and automatically, screen out coffee beans with good color and luster without defects such as crack, mold, being moth-eaten, or being unripe, and quickly classify coffee beans according to their size.

SUMMARY

In view of the above problems, the present application proposes a method of automatically selecting beans and a device applying the method.

In one aspect, the present application proposes a method of automatically selecting beans including the following steps.

Dispersing a plurality of beans on at least a first and a second parallel rows on a motion plane; capturing images of a first part of the beans on the first row and the second row at a first time point; capturing images of a second part of the beans on the first row and the second row at a second time point later than or the same as the first time point; determining a plurality of appearance features of the beans on grounds of the first part images and the second part images; removing beans with or without a first appearance feature selected from the appearance features on the first row at a third time point later than the second time point; collecting the beans without or with the first appearance feature on the first row at a fourth time point later than the third time point; removing the beans with or without the first appearance feature on the second row at a fifth time point later than the fourth time point; and collecting the beans without or with the first appearance feature on the second row at a sixth time point later than the fifth time point. The third time point and the fifth time point are related to the motion speed of the motion plane and the positions of capturing the first part image or the second part image, and the appearance features include surface defects, luster condition, and size differentiation.

In one embodiment, the trajectories of the first row and the second row are linear. In another embodiment, the trajectories of the first row and the second row are curved. Preferably, the trajectories of the first row and the second row are concentric arcs.

In each of the embodiments, the first appearance feature may be one of cracks, broken corners, fragments, foreign objects, moldy objects, moth-caten holes, unripe beans, conchoidal beans, and beans with poor luster.

In each of the embodiments, the first appearance feature may also be beans with size greater than a first predetermined value, beans with size smaller than a second predetermined value, or beans with size within a third predetermined range.

In another aspect, the present application proposes a device of automatically selecting beans including the following components.

A platform being connected to a power source to rotate and having a first surface and a second surface facing away from the first surface; a bean guiding device fixedly arranged above the platform to guide the beans to form at least a first and a second parallel arc-shaped rows on the first surface of the platform in rotation; a first image-capturing device fixedly arranged along the periphery of the platform to capture the first image of the beans on the first arc-shaped row and the second arc-shaped row, the first image-capturing device having a first transverse recess to allow the rotating platform to pass through; a second image-capturing device fixedly arranged along the periphery of the platform to capture the second image of the beans on the first arc-shaped row and the second arc-shaped row, the second image-capturing device having a second transverse recess to allow the rotating platform to pass through; a first removing device fixedly arranged at one side of the second image-capturing device along the periphery of the platform and on top of the first surface with an extension line of the leading edge of the first removing device being intersected with the first arc-shaped row, the first removing device removes the beans with or without the first appearance feature on the first arc-shaped row; a first bean collecting-and-guiding device being fixedly arranged at one side of the first removing device along the periphery of the platform, having a first retaining wall being aligned with the first arc-shaped row and having a width cover only the first arc-shaped row, and being used to guide collection of the beans with or without the first appearance feature on the first arc-shaped row; a second removing device fixedly arranged at one side of the first bean collecting-and-guiding device along the periphery of the platform and on top of the first surface with an extension line of the leading edge of the second removing device being intersected with the second arc-shaped row, the second removing device removes the beans with or without the first appearance feature on the second arc-shaped row; and a second bean collecting-and-guiding device fixedly arranged at one side of the second removing device along the periphery of the platform, having a second retaining wall being aligned with the second arc-shaped row and having a width cover only the second arc-shaped row, and being used to guide collection of the beans with or without the first appearance feature on the second arc-shaped row.

In one embodiment, the bean guiding device has two separate and parallel arc-shaped grooves that are respectively aligned with the first arc-shaped row and the second arc-shaped row, and a space exists between the bean guiding device and the first surface.

In one embodiment, the grooves have the same curvature as the curvature of a circumferential line of the rotating platform.

In one embodiment, the space between the bean guiding device and the first surface may be smaller than the minimum particle size of the beans.

In one embodiment, the first bean collecting-and-guiding device may be provided with a channel being formed to penetrate the first retaining wall and being aligned with the second arc-shaped row.

In one embodiment, the bottom surface of the first bean collecting-and-guiding device or the second bean collecting-and-guiding device may be higher than the first surface.

In one embodiment, the distance between the first retaining wall and the first surface or between the second retaining wall and the first surface may be smaller than the minimum particle size of the beans.

In one embodiment, the first image-capturing device has a first image-capturing unit positioned below the second surface, and the second image-capturing device has a second image-capturing unit positioned above the first surface.

In one embodiment, the surface of the first transverse recess facing the first surface may be white, and the surface of the second transverse recess facing the second surface may be white.

In one embodiment, the device as proposed also includes a dust suction auxiliary device having a first opening and a second opening with the first opening being connected with a dust suction hose and with the second opening being arranged to face the first surface or the second surface, being formed with a notch at the junction of the body of the dust suction auxiliary device and the second opening, and being provided above the first surface or below the second surface to suck the dust of the beans on the first surface or the second surface through the notch.

In one embodiment, the device as proposed also includes a bean dispersing device having a dispersing plate and a dispersing guide rail connected to each other and being fixedly arranged along the periphery of the platform and located behind the bean guiding device, wherein the dispersing guide rail may be formed with an open end at the end and a partition wall in the center to create two parallel linear tracks, and the open end may be located above the first surface and aligned with one end of the bean guiding device.

In one embodiment, the bean dispersing device may be connected with a vibrator generating a vibration to move the beans from the dispersing plate to the dispersing guide rail.

In one embodiment, the device as proposed also includes a bean converging device having openings at two ends and being arranged above the bean dispersing device to gather the beans into the dispersing plate, wherein one of the openings may be used to receive the beans while the other one of the openings may be aligned with the dispersing plate.

In various embodiments, the first removing device or the second removing device may be an air jet device using air flow.

To sum up, the proposed method and device of automatically selecting beans not only enables accurate and fast quality identification for the beans by using the specially designed algorithm applied in the image-capturing device but also performs bean selection on multiple parallel rows at the same time. Therefore, the proposed method and device of automatically selecting beans have the advantage of saving time and effort by saving workforce and shortening the time for automatic bean selection.

Various other objects, advantages and features of the present invention will become readily apparent from the ensuing detailed description accompanying drawings, and the novel features will be particularly pointed out in the appended claims.

BRIEF DESCRIPTION OF DRAWINGS

The following detailed descriptions, given by way of example, and not intended to limit the present invention solely thereto, will be best understood in conjunction with the accompanying figures.

DETAILED DESCRIPTION OF THE EMBODIMENTS

Figure 1:
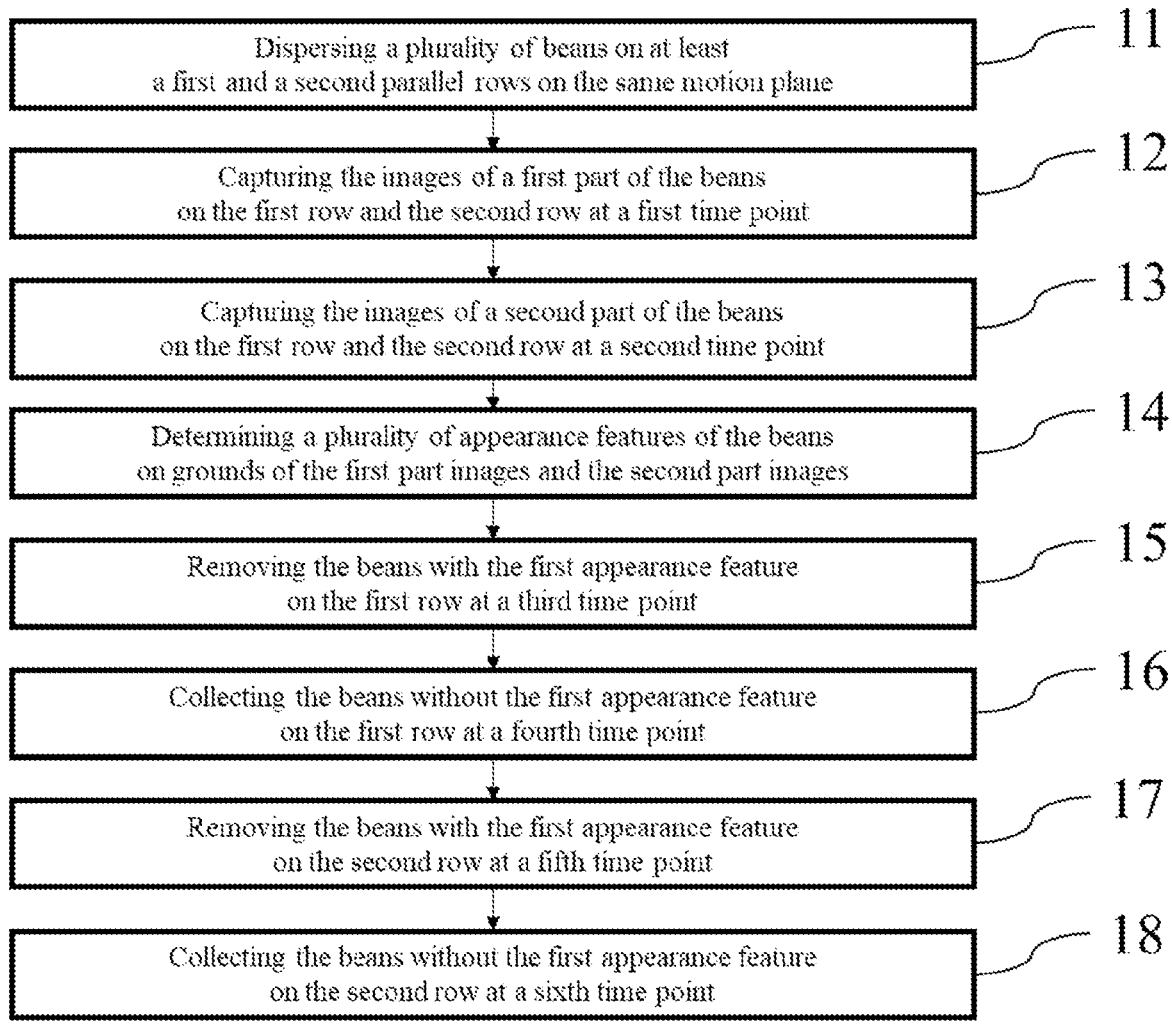
FIG. 1 is a flow chart illustrating generic steps of a method of automatically selecting beans according to the present application.
Figure 2:
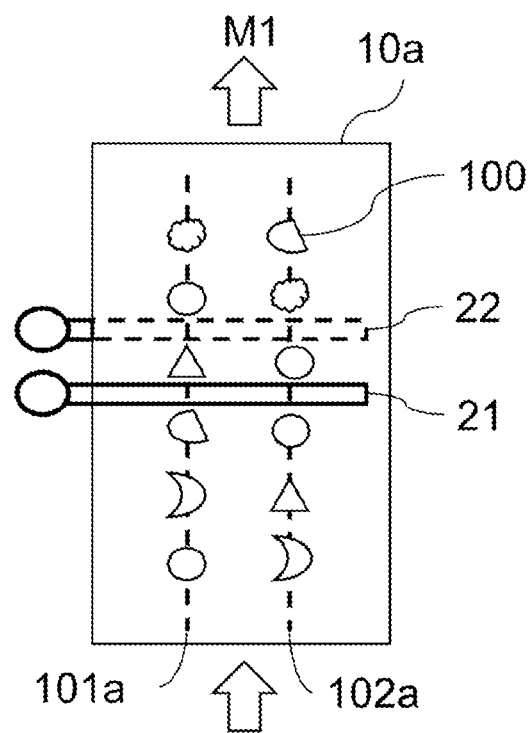
FIG. 2 is a schematic diagram of a first specific implementation embodiment according to the method of automatically selecting beans of FIG. 1.
Figure 3:
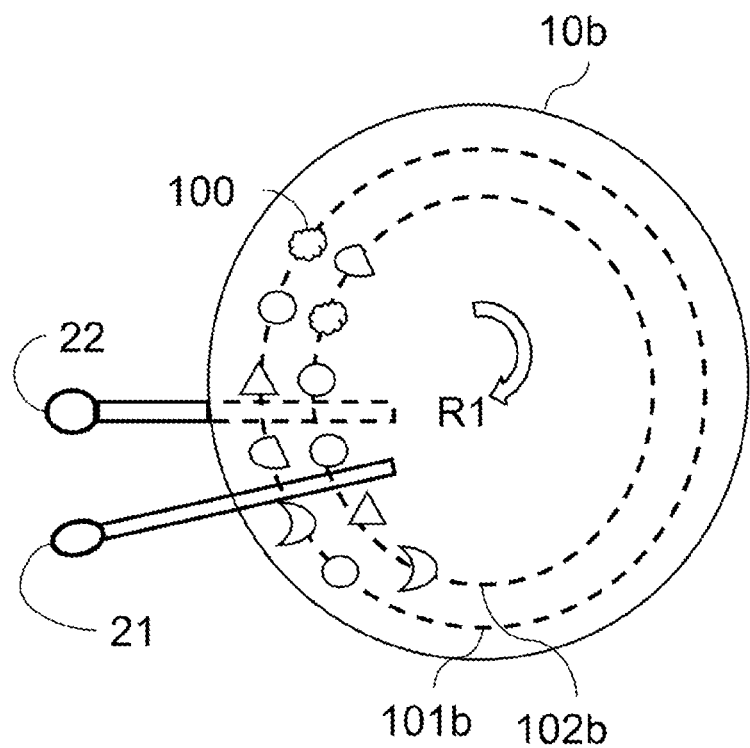
FIG. 3 is a schematic diagram of a second specific implementation embodiment according to the method of automatically selecting beans of FIG. 1.

FIG. 1 is a flow chart illustrating generic steps of a method of automatically selecting beans according to the present application. FIG. 2 is a schematic diagram of a first specific implementation embodiment according to the method of automatically selecting beans of FIG. 1. FIG. 3 is a schematic diagram of a second specific implementation embodiment according to the method of automatically selecting beans of FIG. 1.

As shown in FIG. 1, a method of automatically selecting beans according to the present application may include the following steps.

Step 11: Dispersing a plurality of beans on at least a first and a second parallel rows on the same motion plane. The first row and the second row may be a linear rows having straight trajectories or curved rows having curved trajectories.

In the embodiment shown in FIG. 2, a group of more than two beans 100 are gathered together and dispersed on the first linear row 101a and the second linear row 102a, which are parallel to each other, on the same moving plane 10a. Alternatively, in the embodiment shown in FIG. 3, the beans 100 are dispersed on the first arc-shaped row 101b and the second arc-shaped row 102b, which are parallel to each other, on the same rotating plane 10b. The first linear row 101a and the second linear row 102a in FIG. 2 move simultaneously with the linear movement (shown by arrow M1) of the moving plane 10a. The first arc-shaped row 101b and the second arc-shaped row 102b in FIG. 3 rotate simultaneously with the rotation (shown by the arrow R1) of the rotating plane 10b. The trajectories of the first arc-shaped row 101b and the second arc-shaped row 102b are concentric arcs of a circle. Beans 100 may be, for example, coffee beans. In other embodiments, a plurality of beans may be dispersed in more than three rows that are parallel to each other on the same motion plane. That is, there may also be a third row, a fourth row, a fifth row, etc. in addition to the above-mentioned first row and the second row.

Step 12: Capturing the images of a first part of the beans on the first row and the second row at a first time point.

In the embodiment shown in FIG. 2, when the beans 100 on the first linear row 101*a* and the second linear row 102*a* pass through the capturing area of a first image-capturing device 21 which is arranged at a fixed position and has its capturing area span the first linear row 101*a* and the second linear row 102*a*, the images of the first part such as the upper part (the part viewed from the top of the drawing in FIG. 2) of the beans 100 on the first linear row 101*a* and the second linear row 102*a* are captured at the same time. Alternatively, in the embodiment shown in FIG. 3, when the beans 100 on the first arc-shaped row 101*b* and the second arc-shaped row 102*b* pass through the capturing area of a first image-capturing device 21 which is set at a fixed position and has its capturing area span the first arc-shaped row 101*b* and the second arc-shaped row 102*b*, the images of the first part such as the upper part (the part viewed from the top of the drawing in FIG. 3) of the beans 100 on the first arc-shaped row 101*b* and the second arc-shaped row 102*b* are captured at the same time. In other embodiments not shown in the figures, the first part image of the beans may be a side part image such as a right-side part image of the bean.

Step 13: Capturing the images of a second part of the beans on the first row and the second row at a second time point. The second time point is later than or the same as the first time point.

In the embodiment shown in FIG. 2, when the beans 100 on the first linear row 101*a* and the second linear row 102*a* pass through the capturing area of a second image-capturing device 22 which is set at a fixed position and has its capturing area span the first linear row 101*a* and the second linear row 102*a*, the images of the second part such as the lower part (the part viewed from the bottom of the drawing in FIG. 2) of the beans 100 on the first linear row 101*a* and the second linear row 102*a* are captured at the same time. Alternatively, in the embodiment shown in FIG. 3, when the beans 100 on the first arc-shaped row 101*b* and the second arc-shaped row 102*b* pass through the capturing area of the second image-capturing device 22 which is set at a fixed position and has its capturing area span the first arc-shaped row 101*b* and the second arc-shaped row 102*b*, the images of the second part such as the lower part (the part viewed from the bottom of the drawing in FIG. 3) of the beans 100 on the first arc-shaped row 101*b* and the second arc-shaped row 102*b* are captured at the same time. The time of capturing the second part image may be later than or at the same time as the first time point of capturing the first part image in step 12. When the second part image is captured at the same time as the first part image is captured in step 12, the second image-capturing device 22 and the first image-capturing device 21 may be assembled together. In other embodiments not shown in the figures, the second part image of the beans may be another side part image such as a left-side part image of the bean.

Step 14: Determining a plurality of appearance features of the beans on grounds of the first part images and the second part images. The appearance features include surface defects, luster condition, and size differentiation.

In one embodiment, as shown in FIG. 2 and FIG. 3, the appearance features including the surface defects and the luster condition of the beans 100 may be obtained from the images of the upper part and the lower part of the beans 100. Therefore, the images of the upper part and the lower part of the beans 100 may be used with various algorithms to determine the defective products among the beans 100. The defective products refer to beans with surface defects such as cracks, broken corners, fragments, foreign objects, moldy objects, moth-caten holes, etc., or unripe beans, or conchoidal beans, or beans with poor luster. The abovementioned algorithms may be known algorithms or specially designed algorithms. In other embodiments, the appearance features may also be a predetermined size threshold such as above or below 2 cm or within a specific size range such as between 1 cm and 2 cm. That is, the appearance sizes of the beans 100 are obtained from the images of the upper part or the lower part of the beans 100, and various algorithms are applied to determine whether the appearance size of each of the beans 100 is above or below the predetermined size threshold or within the specific size range.

Step 15: Removing the beans with the first appearance feature on the first row at a third time point. The third time point is later than the second time point. The first appearance feature is one of the appearance features determined in step 14.

In one embodiment, as shown in FIG. 2, a first removing device (not shown) may be provided around a first removal position on the first linear row 101*a*. The beans 100 with the first appearance feature on the first linear row 101*a* will be removed when arriving at the first removal position. The third time point is related to the moving speed of the moving plane 10*a* and the position of capturing the upper part image or the lower part image of the beans 100 on the first linear row 101*a*. In the situation where the first appearance feature identifies a defective product, when the beans 100 on the first linear row 101*a* passing through the first image-capturing device 21 are determined to be defective products, the defects of the beans 100 are at the upper parts and the defective products will be removed when arriving at the first removal position. In addition, the third time point may be obtained from the linear distance from the first image-capturing device 21 to the first removal position and the moving speed of the moving plane 10*a*, the realization of which is by means of a control device electrically connected to the first image-capturing device 21 and the first removing device. Similarly, in the situation where the first appearance feature identifies a defective product, when the beans 100 on the first linear row 101*a* passing through the second image-capturing device 22 are determined to be defective products, the defects of the beans 100 are at the lower parts and the defective products will be removed when arriving at the first removal position, and the third time point may be obtained from the linear distance from the second image-capturing device 22 to the first removal position and the moving speed of the moving plane 10*a*, the realization of which is by means of a control device electrically connected to the second image-capturing device 22 and the first removing device.

In another embodiment, as shown in FIG. 3, a first removing device (not shown) is provided around the first removal position for the first arc-shaped row 101*b*. The beans 100 with the first appearance feature on the first arc-shaped row 101*b* will be removed when arriving at the first removal position. The third time point is related to the rotating speed of the rotating plane 10*b* and the position of capturing the upper part image or the lower part image of the beans 100 on the first arc-shaped row 101*b*. In the situation where the first appearance feature represents a defective product, when the beans 100 on the first arc-shaped row 101b passing through the first image-capturing device 21 are determined to be defective products, the defects of the beans 100 are at the upper parts and the defective products will be removed when reaching the first removal position, and the third time point may be obtained by the curved distance from the first image-capturing device 21 to the first removal position and the rotating speed of the rotating plane 10b, the realization of which is by means of a control device electrically connected to the first image-capturing device 21 and the first removing device. Similarly, in the situation where the first appearance feature identifies a defective product, when the beans 100 on the first arc-shaped row 101b passing through the second image-capturing device 22 are determined to be defective products, the defects of the beans 100 are at the lower parts and the defective products will be removed when arriving at the first removal position, and the third time point may be obtained from the curved distance from the second image-capturing device 22 to the first removal position and the rotating speed of the rotating plane 10b, the realization of which is by means of a control device electrically connected to the second image-capturing device 22 and the first removing device. In the situation where the first appearance feature identifies beans with size greater than a predetermined value, the beans 100 on either the first linear row 101a in FIG. 2 or the first arc-shaped row 101b in FIG. 3 that have been determined by the first image-capturing device 21 or the second image-capturing device 22 to be greater than the predetermined value in size will be removed when passing through the first removing device.

In other embodiments, it is also possible to achieve the removal of the first row beans without the first appearance feature at the third time point later than the second time point by means of a control device electrically connected to the first image-capturing device 21, the second image-capturing device 22, and the first removing device.

Step 16: Collecting the beans without the first appearance feature on the first row at a fourth time point. The fourth time point is later than the third time point.

In one embodiment, for example, a first collecting device (not shown) is provided around a first collection position for the first linear row 101a in FIG. 2. The first collection position is in front of the first removal position so that the first linear row 101a arrives firstly at the first removal position and then at the first collection position. In the situation where the first appearance feature identifies a defective product, the beans 100 other than the defective products on the first linear row 101a will be collected when arriving at the first collection position.

In another embodiment, for example, a first collecting device (not shown) is provided around the first collection position for the first arc-shaped row 101b in FIG. 3. The first collection position is in front of the first removal position so that the first arc-shaped row 101b arrives firstly at the first removal position and then at the first collection position. In the situation where the first appearance feature identifies a defective product, the beans 100 other than the defective products on the first arc-shaped row 101b will be collected when arriving at the first collection position. Since the first collecting device is in front of the first removing device, the fourth time point must be later than the third time point. In the situation where the first appearance feature identifies beans with size greater than a predetermined value, the beans on either the first linear row 101a in FIG. 2 or the first arc-shaped row 101b in FIG. 3 and with size other than those greater than the predetermined value will be collected by the first collecting device.

In other embodiments, if the beans without the first appearance feature on the first row are removed at a third time point later than the second time point, then this step may be that collecting the beans with the first appearance feature on the first row at the fourth time point later than the third time point.

Step 17: Removing the beans with the first appearance feature on the second row at a fifth time point. The fifth time point is later than the fourth time point. The first appearance feature may identify a defective product or a bean with size greater than a predetermined lower limit.

In one embodiment, as shown in FIG. 2, a second removing device (not shown) is provided around a second removal position for the second linear row 102a, and the second removal position is located in front of the first collection position. In that case, the second linear row 102a arrives firstly at the first collection position and then at the second removal position. The beans 100 with the first appearance feature on the second linear row 102a will be removed when arriving at the second removal position, and the fifth time point is related to the moving speed of the moving plane 10a and the position of capturing the upper part image or the lower part image of the beans 100 on the second linear row 102a. In the situation where the first appearance feature identifies a defective product, when the beans 100 on the second linear row 102a passing through the first image-capturing device 21 are determined to be defective products, the defect of the beans 100 are at the upper parts and the defective products will be removed when arriving at the second removal position. In addition, the fifth time point may be obtained from the linear distance from the first image-capturing device 21 to the second removal position and the moving speed of the moving plane 10a, the realization of which is by means of a control device electrically connected to the first image-capturing device 21 and the second removing device. Similarly, in the situation where the first appearance feature identifies a defective product, when the beans 100 on the second linecar row 102a passing through the second image-capturing device 22 are determined to be defective products, the defective products will be removed when arriving at the second removal position, and the fifth time point may be obtained from the linear distance from the second image-capturing device 22 to the second removal position and the moving speed of the moving plane 10a, the realization of which is by means of a control device electrically connected to the second image-capturing device 22 and the second removing device.

In another embodiment, as shown in FIG. 3, a second removing device (not shown) is provided around the second removal position for the second arc-shaped row 102b, and the second removal position is located in front of the first collection position. In that case, the second arc-shaped row 102b arrives firstly at the first collection position and then at the second removal position. The beans 100 with the first appearance feature on the second arc-shaped row 102b will be removed when arriving at the second removal position. The fifth time point is related to the rotating speed of the rotating plane 10b and the position of capturing the upper part image or the lower part image of the beans 100 on the second arc-shaped row 102b. In the situation where the first appearance feature identifies a defective product, when the beans 100 on the second arc-shaped row 102b passing through the first image-capturing device 21 are determined to be defective products, the defects of the beans 100 are at the upper parts and the defective products will be removed when arriving at the second removal position, and the fifth time point may be obtained from the curved distance from the first image-capturing device 21 to the second removal position and the rotating speed of the rotating plane 10b, the realization of which is by means of a control device electrically connected to the first image-capturing device 21 and the second removing device. Similarly, in the situation where the first appearance feature identifies a defective product, when the beans 100 on the second arc-shaped row 102b passing through the second image-capturing device 22 are determined to be defective products, the defective products will be removed when arriving at the second removal position, and the fifth time point may be obtained from the curve distance from the second image-capturing device 22 to the second removal position and the rotating speed of the rotating plane 10b, the realization of which is by means of a control device electrically connected to the second image-capturing device 22 and the second removing device. In the situation where the first appearance feature identifies beans with size greater than a predetermined value, the beans 100 on either the second linear row 102a in FIG. 2 or the second arc-shaped row 102b in FIG. 3 that have been determined by the first image-capturing device 21 or the second image-capturing device 22 to be greater than the predetermined value in size will be removed when passing through the second removing device.

In other embodiments, it is also possible to achieve the removal of the second row beans without the first appearance feature at the fifth time point later than the fourth time point by means of a control device electrically connected to the first image-capturing device 21, the second image-capturing device 22, and the second removing device.

Step 18: Collecting the beans without the first appearance feature on the second row at a sixth time. The sixth time point is later than the fifth time point.

In one embodiment, for example, a second collecting device (not shown) is provided around a second collection position for the second linear row 102a in FIG. 2. The second collection position is in front of the second removal position so that linear row 102a arrives firstly at the second removal position and then at the second collection position. In the situation where the first appearance feature identifies a defective product, the beans 100 other than the defective products on the second linear row 102a will be collected when arriving at the second collection position.

In another embodiment, for example, a second collecting device (not shown) is provided around the second collection position for the second arc-shaped row 102b in FIG. 3. The second collection position is in front of the second removal position so that the second arc-shaped row 102b arrives firstly at the second removal position and then at the second collection position. In the situation where the first appearance feature identifies a defective product, the beans 100 other than the defective products on the second arc-shaped row 102b will be collected when arriving at the second collection position. Since the second collecting device is in front of the second removing device, the sixth time point must be later than the fifth time point. In the situation where the first appearance feature identifies beans with size greater than a predetermined value, the beans on either the second linear row 102a in FIG. 2 or the second arc-shaped row 102b in FIG. 3 and with size other than those greater than the predetermined value will be collected by the second collecting device.

In other embodiments, if the beans without the first appearance feature on the second row are removed at the fifth time point later than the fourth time point, then this step may be that collecting the beans with the first appearance feature on the second row at the sixth time point later than the fifth time point.

In the abovementioned method of automatically selecting beans, in addition to one-time removal and one-time collection of beans on each parallel row based on the first appearance feature, multiple-times removal and one-time collection on each parallel row based on more than one appearance features may be performed. For example, the first appearance feature may be used to identify a defective product and a second appearance feature may be used to identify beans with size greater than a predetermined value, and therefore defective products with size greater than the predetermined value, non-defective products with size greater than the predetermined value, non-defective products with size other than those greater than the predetermined value, and defective products with size other than those greater than the predetermined value may be selected separately. On the other hand, the abovementioned method of automatically selecting beans can also perform multiple-times removal and one-time collection of beans on each parallel row based on different grades of the same appearance feature. For example, the defective products may be removed in three times including a first removal of highly defective products, a second removal of moderate defective products, and a third removal of low-level defective products, and the non-defective products are collected at final. Therefore, in the abovementioned method, the removing devices and the collecting devices equipped in each row is the same, and the number of the bean-removing devices and the bean-collecting devices is proportional to the number of the appearance features or the number of grades of the appearance features.

Figure 4:
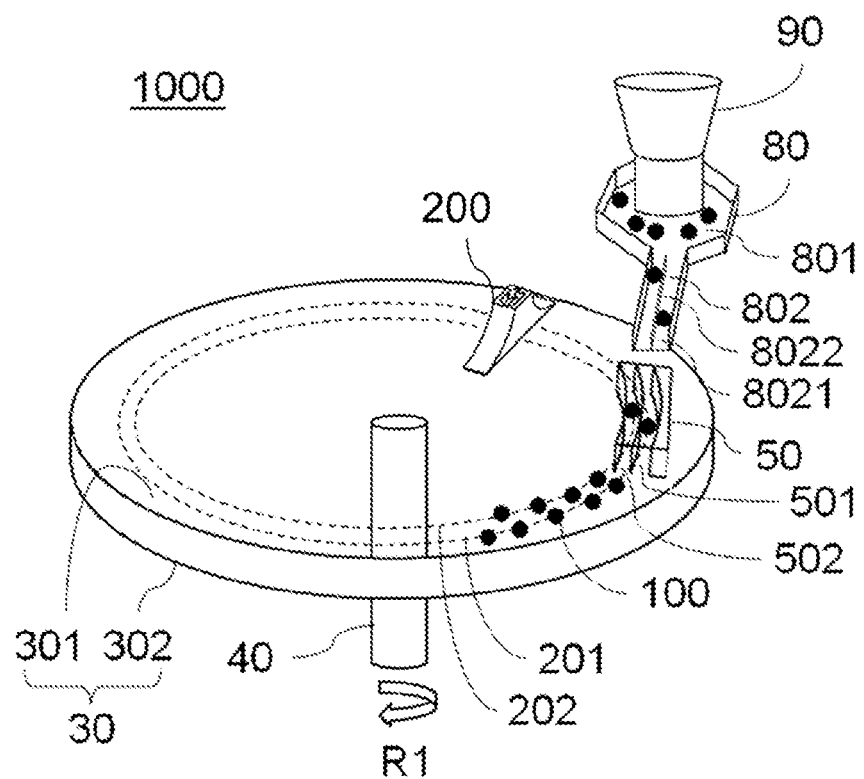
FIG. 4 is a schematic view of a bean guiding device, a bean dispersing device, and a bean converging device of a device of automatically selecting beans according to the embodiment of FIG. 3.
Figure 5:
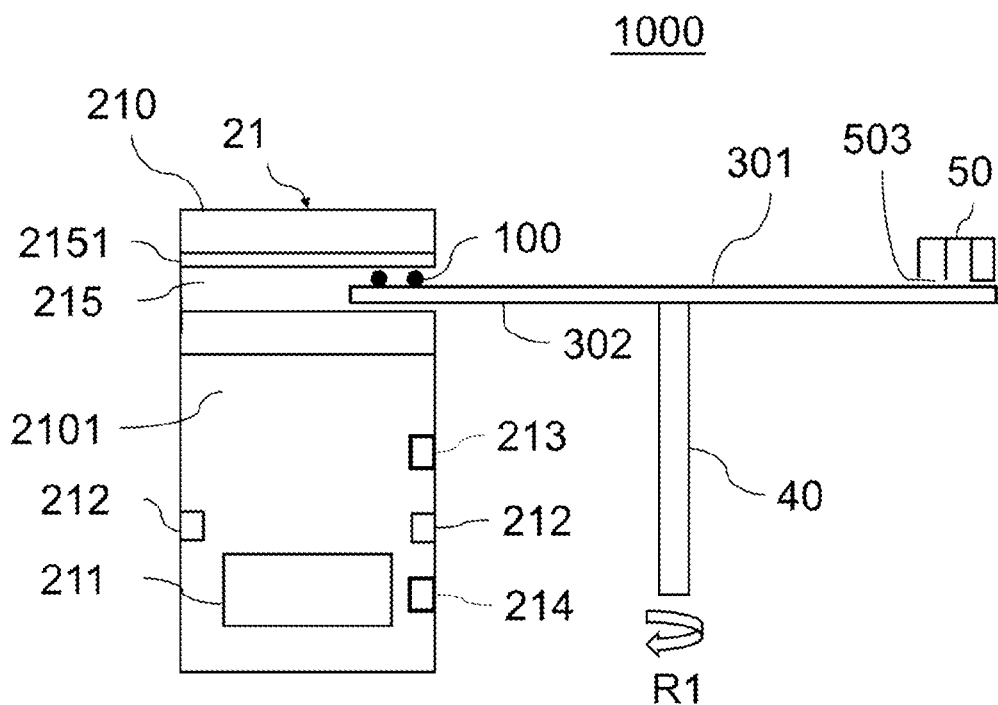
FIG. 5 is a schematic view of a first image-capturing device for beans of the device of automatically selecting beans according to the embodiment of FIG. 3.
Figure 6:
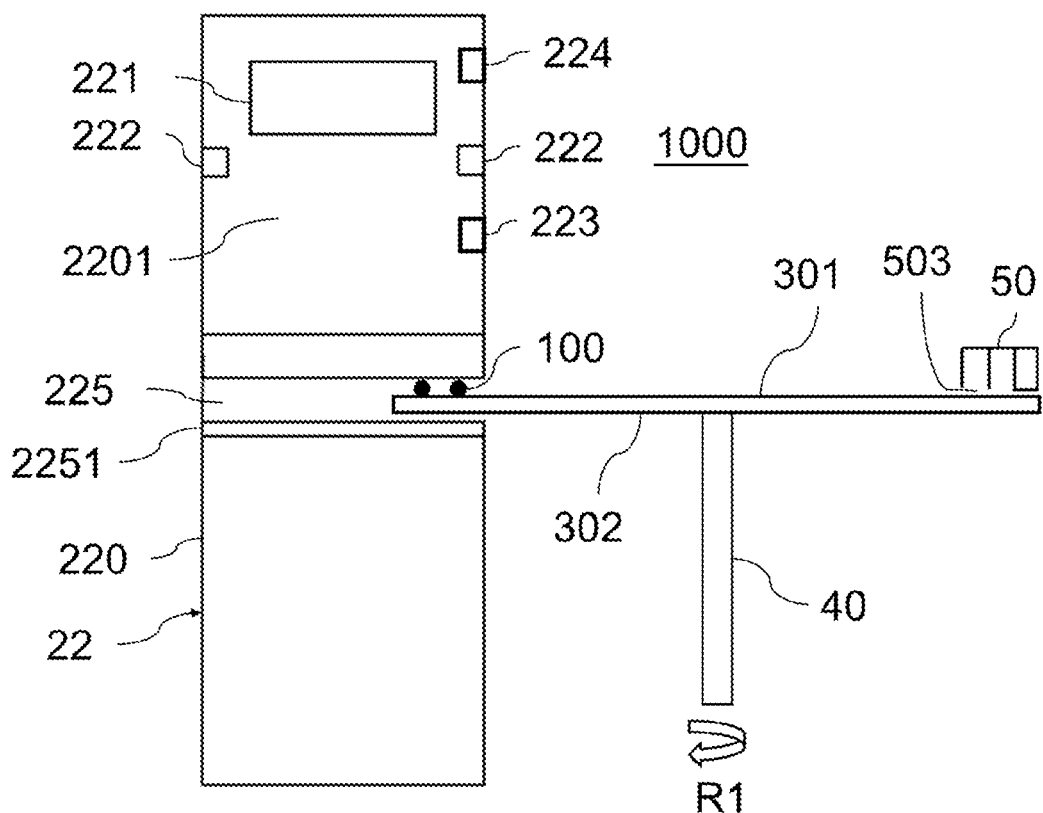
FIG. 6 is a schematic view of a second image-capturing device for beans of the device of automatically selecting beans according to the embodiment of FIG. 3.
Figure 7:
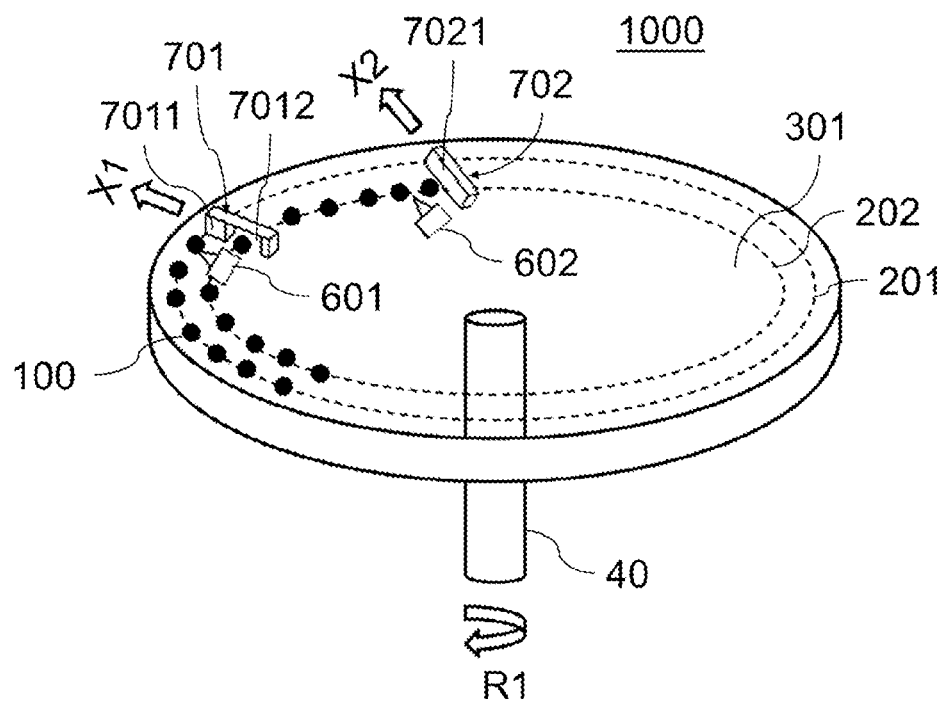
FIG. 7 is a schematic view of a first-appearance bean removing device and a first-appearance bean-collecting device of the device of automatically selecting beans according to the embodiment of FIG. 3.

FIG. 4 is a schematic view of a bean guiding device, a bean dispersing device, and a bean converging device of a device of automatically selecting beans according to the embodiment of FIG. 3. FIG. 5 is a schematic view of a first image-capturing device for beans of the device of automatically selecting beans according to the embodiment of FIG. 3. FIG. 6 is a schematic view of a second image-capturing device for beans of the device of automatically selecting beans according to the embodiment of FIG. 3. FIG. 7 is a schematic view of a first-appearance bean removing device and a first-appearance bean-collecting device of the device of automatically selecting beans according to the embodiment of FIG. 3. Referring to FIG. 4 to FIG. 7, in one embodiment, a device 1000 of automatically selecting beans according to the embodiment of FIG. 3 includes at least a platform 30, a transmission shaft 40, a bean guiding device 50 fixedly placed above the platform 30, a first image-capturing device 21, a second image-capturing device 22, a first removing device 601, a second removing device 602, a first bean collecting-and-guiding device 701 and a second bean collecting-and-guiding device 702. The platform 30 has a first surface 301 and a second surface 302 facing away from the first surface 301. The first surface 301 and the second surface 302 are preferably transparent surfaces. In this embodiment, the first surface 301 is the top surface of the platform 30 while the second surface 302 is the bottom surface of the platform 30, and the first surface 301 serves as a plane where the beans 100 are dispersed. The transmission shaft 40 is connected to a drive shaft (not shown) of a power source to rotate clockwise as shown by the arrow R1 in FIG. 4 and thereby drives the platform 30 to rotate. For example, the power source may be but not limited to a motor, a pneumatic cylinder, or a hydraulic cylinder. The platform 30 is preferably a circular platform because the circular shape facilitates the arrangement of the image-capturing devices and the bean-collecting devices and saves the volume of the entire device. In any event, the shape of the platform 30 is not limited to circular as long as the platform 30 has the capability of rotation.

Still referring to FIG. 4 to FIG. 7, in this embodiment, the beans 100 dispersed by the bean dispersing device 80, which will be described later, are guided by the bean guiding device 50 to form the first arc-shaped row 201 and the second arc-shaped row 202 that are parallel with each other on the rotating platform 30. As shown in FIG. 4, the bean guiding device 50 in the present embodiment is a structure formed with two separated arc-shaped grooves 501 and 502 and with openings at two ends. The grooves 501 and 502 are parallel to each other and have the same curvature as the curvature of any circumferential line of the rotating platform 30. The groove 501 is aligned with the first arc-shaped row 201 and the groove 502 is aligned with the second arc-shaped row 202. As shown in FIG. 4 to FIG. 6, a space 503 exists between the surface of the entire bean guiding 50 facing the first surface 301 of the platform 30 and the first surface 301 so that the first surface 301 of the platform 30 and the bean guiding device 50 do not contact with each other. Notably, the space 503 must be smaller than the minimum particle size of the beans 100 to avoid the beans 100 from falling out of the grooves 501 or 502. For example, the space 503 may be 0.8 cm when the minimum particle size of the beans 100 is 1 cm. The size of the space 503 is not limited thereto if the space 503 has the capability of avoiding the beans 100 from falling out of the grooves 501 and 502. In one embodiment, the first arc-shaped row 201 may be formed near the outermost edge of the first surface 301 of the platform 30 and the groove 501 may be located directly above the first arc-shaped row 201.

Figure 8:
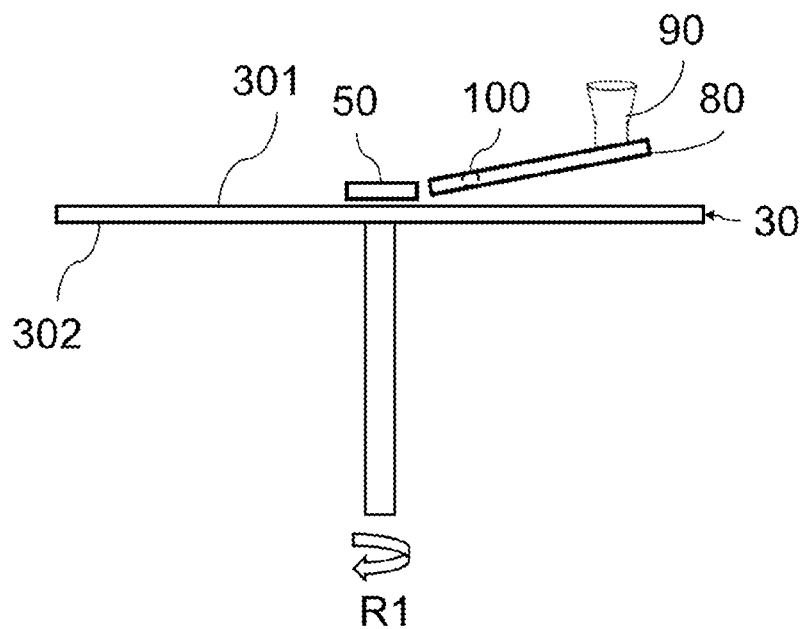
FIG. 8 is a schematic view showing the positional relationship among the bean guiding device, the bean dispersing device, and the bean converging device in one embodiment of the device in FIG. 4.

Still referring to FIG. 4, in this embodiment, the device 1000 of automatically selecting beans according to the embodiment of FIG. 3 also includes a bean dispersing device 80 and a bean converging device 90. FIG. 8 is a schematic view showing the positional relationship among the bean guiding device, the bean dispersing device, and the bean converging device in one embodiment of the device in FIG. 4. The bean dispersing device 80 is fixedly arranged along the periphery of the platform 30 and is located behind the bean guiding device 50 when viewed from the rotation direction of the platform 30, that is, the beans firstly arrive at the bean dispersing device 80 and then arrive at the bean guiding device 50. The bean converging device 90 is arranged above the bean dispersing device 80. In this embodiment, the bean dispersing device 80 has a dispersing plate 801 and a dispersing guide rail 802 connected to each other. Besides the dispersing guide rail 802 is formed with an open end 8021 at the end, the periphery of the dispersing plate 801 and the dispersing guide rail 802 are formed with walls to prevent beans 100 from falling out of the bean dispersing device 80. The dispersing guide rail 802 is formed with a partition wall 8022 in the center to create two parallel linear tracks. The partition wall 8022 extends from the junction of the dispersing plate 801 and the dispersing guide rail 802 to the open end 8021 of the dispersing guide rail 802, so that the beans 100 moving from the dispersing plate 801 to the dispersing guide rail 802 are dispersed by the partition wall 8022 to the two parallel tracks. As long as the dispersing guide 802 has the capability to disperse the beans 100 to two parallel tracks, the dispersing guide 802 is not limited to a linear track and may be a curved track. On the other hand, the bean converging device 90 is a tubular body with openings at both ends. One end opening of the bean converging device 90 such as an upper end opening is used to receive a group of beans 100, and the other end opening of the bean converging device 90 such as a lower end opening is used to be aligned with the dispersing plate 801 of the bean dispersing device 80 so that the beans 100 may be gathered to the dispersing plate 801 when exiting from the bean converging device 90. Notably, the bean dispersing device 80 may connect with a vibrator (not shown) and the vibration of the vibrator allow the gathered beans to gradually move from the dispersing plate 801 to the dispersing guide rail 802 to achieve the purpose of dispersing the beans. The open end 8021 of the dispersing guide rail 802 is located above the first surface 301 of the platform 30 to enable the beans 100 exiting from the open end 8021 to fall onto the first surface 301. Additionally, as shown in FIG. 8, the bean dispersing device 80 may be arranged in a slanting manner with respect to the platform 30 when viewed from the horizontal position of the platform 30 so that the dispersing plate 801 is higher than the opening end 8021 of the dispersing guide rail 802 and therefore the beans 100 can automatically fall on the platform 30 due to their gravity.

Referring to FIG. 4, in this embodiment, the open end 8022 of the dispersing guide rail 802 of the bean dispersing device 80 is aligned with one end of the bean guiding device 50, and the two tracks of the dispersing guide rail 802 are respectively aligned with the two grooves 501 and 502 of the bean guiding device 50. In that case, the beans 100 falling from the two tracks of the dispersing guide rail 802 are subsequently guided by the grooves 501 and 502 to form the first arc-shaped row 201 and the second arc-shaped row 202 that are parallel without interference with each other on the rotating platform 30. Therefore, it is not a matter whether the bean guiding device 50 connects with the dispersing guide rail 802 as long as the bean guiding device 50 has the above-mentioned capabilities.

Referring to FIG. 4 and FIG. 5, in this embodiment, the first image-capturing device 21 is fixedly arranged along the periphery of the platform 30 and has its image-capturing area span the first arc-shaped row 201 and the second arc-shaped row 202. In addition, the first image-capturing device 21 is arranged in front of the bean guiding device 50 when viewed from the rotation direction of the platform 30, that is, the beans 100 firstly pass through the bean guiding device 50 and then arrive at the first image-capturing device 21 when the beans rotate clockwise (top view) with the platform 30. As shown in FIG. 5, the first image-capturing device 21 has a first housing 210 which is provided inside with at least a first image capturing unit 211, a first light-emitting unit 212, a first sensing unit 213, and a first micro-processing unit 214. The first image capturing unit 211, the first light-emitting unit 212, and the first sensing unit 213 are each electrically connected to the first micro-processing unit 214 such that the first micro-processing unit 214 has the capability to control the first image capturing unit 211, the first light-emitting unit 212, and the first sensing unit 213. The first micro-processing unit 214 may be further electrically connected with an operation interface (not shown) on the first housing 210 or an external computer (not shown). The first housing 210 has a first transverse recess 215 formed to allow the rotating platform 30 to pass through to avoid the platform 30 from colliding with the first image-capturing device 21. The first housing 210 is formed with a first enclosed space 2101 below the first transverse recess 215 to accommodate the first image-capturing unit 211, the first light-emitting unit 212, the first sensing unit 213, and the first micro-processing unit 214. Therefore, the first image-capturing unit 211, the first light-emitting unit 212, the first sensing unit 213, and the first micro-processing unit 214 are all located below the second surface 302 of the platform 30. The beans 100 begin to pass through the first image-capturing device 21 when the first sensing unit 213 detects the beans 100 on the first surface 301 of the platform 30, and the first micro-processing unit 214 receives the signals from the first sensing unit 213 and instructs the first light-emitting unit 212 and the first image-capturing unit 211 to act in a matter that the first image-capturing unit 211 captures an image of the lower part of the beans 100 after the first light-emitting unit 212 emits light. Notably, the surface of the first transverse recess 215 which faces the first surface 301 of the platform 30 is preferably white or adhered with a first white paper 2151 besides the first surface 301 and the second surface 302 of the platform 30 are transparent to enable the first image-capturing unit 211 to clearly capture the image of the lower part of the beans 100. In this embodiment, the first housing 210 is, for example, a cylinder, and the first light-emitting unit 212 is provided in a surrounding manner on the inner wall of the first housing 210.

Still referring to FIG. 4, FIG. 5, and FIG. 6, in this embodiment, the second image-capturing device 22 is fixedly arranged along the periphery of the platform 30 and has its image-capturing area span the first arc-shaped row 201 and the second arc-shaped row 202. In addition, the second image-capturing device 22 is arranged in front of the first image-capturing device 21 when viewed from the rotation direction of the platform 30, that is, the beans 100 firstly pass through the first image-capturing device 21 and then arrive at the second image-capturing device 22 when the beans rotate clockwise (top view) with the platform 30. As shown in FIG. 6, the second image-capturing device 22 has a second housing 220 which is provided inside with at least a second image-capturing unit 221, a second light-emitting unit 222, a second sensing unit 223, and a second micro-processing unit 224. The second image-capturing unit 221, the second light-emitting unit 222, and the second sensing unit 223 are each electrically connected to the second micro-processing unit 224 such that the second micro-processing unit 224 has the capability to control the second image-capturing unit 221, the second light-emitting unit 222, and the second sensing unit 223. The second micro-processing unit 224 may be further electrically connected with an operation interface (not shown) on the second housing 220 or an external computer (not shown). The second housing 220 has a second transverse recess 225 formed to allow the rotating platform 30 to pass through to avoid the platform 30 from colliding with the second image-capturing device 22. The second housing 220 is formed with a second enclosed space 2201 above the second transverse recess 225 to accommodate the second image-capturing unit 221, the second light-emitting unit 222, the second sensing unit 223, and the second micro-processing unit 224. Therefore, the second image-capturing unit 221, the second light-emitting unit 222, the second sensing unit 223, and the second micro-processing unit 224 are all located above the first surface 301 of the platform 30. The beans 100 begin to pass through the second image-capturing device 22 when the second sensing unit 223 detects the beans 100 on the first surface 301 of the platform 30, and the second micro-processing unit 224 receives the signals from the second sensing unit 223 and instructs the second light-emitting unit 222 and the second image-capturing unit 221 to act in a manner that the second image-capturing unit 221 captures an image of the upper part of the beans 100 after the second light-emitting unit 222 emits light. Notably, the surface of the second transverse recess 225 which faces the second surface 302 of the platform 30 is preferably white or adhered with a second white paper 2251 besides the first surface 301 and the second surface 302 of the platform 30 are transparent to enable the second image-capturing unit 221 to clearly capture the image of the upper part of the beans 100. In this embodiment, the second housing 220 is, for example, a cylinder, and the second light-emitting unit 222 is provided in a surrounding manner on the inner wall of the second housing 220.

Referring to FIG. 5 and FIG. 6, in this embodiment, the rotating platform 30 is arranged to firstly pass through the first image-capturing device 21 and then pass through the second image-capturing device 22. Therefore, the images of the lower part of the beans 100 are firstly captured, while the images of the upper part of the bean 100 are secondly captured. However, in other embodiments, the rotating platform 30 may be arranged to firstly pass through the second image-capturing device 22 and then pass through the first image-capturing device 21, and in that case, the images of the upper part of the beans 100 are firstly captured while the images of the lower part of the beans 100 are secondly captured. Alternatively, in other embodiments, all the components in the first image-capturing device 21 and the second image-capturing device 22 may be reassembled into an integrated image-capturing device which is used to completely capture the images of the upper part and the lower part of the beans. Moreover, in other embodiments, the images of the upper part and the lower part of the beans 100 may be captured at the same time when the capturing actions do not interfere with each other. In the abovementioned embodiments, each of the first image-capturing unit 211 and the second image-capturing unit 221 may be but not limited to a charge coupled device (CCD) type or a complementary metal-oxide-semiconductor type. The first light-emitting unit 212 and the second light-emitting unit 222 may be but not limited to light-emitting elements composed of more than two light-emitting diodes (LEDs) or organic light-emitting diodes (OLEDs). The first sensing unit 213 and the second sensing unit 223 may be but not limited to infrared sensors used to detect or other sensors used to determine whether the beans 100 have passed the first image-capturing device 21 or the second image-capturing device 22. The first micro-processing unit 214 and the second micro-processing unit 224 are integrated circuits with the functions of executing a series of instructions, calculation, storage, etc., in a specific program and may have the capability of transmitting the stored instructions or signals to an external connected computer. For example, the first micro-processing unit 214 and the second micro-processing unit 224 may be chips. In other embodiments, the image-capturing units are not limited to be positioned above and below the beans and may be on the right side or the left side of the beans, or laterally positioned with a specific included angle of 30 degrees or 60 degrees with the horizontal plane.

Referring to FIG. 5 to FIG. 7, in this embodiment, the first removing device 601 and the first bean collecting-and-guiding device 701 are fixedly arranged along the periphery of the platform 30 to be adjacent to each other and on top of the first surface 301 of the platform 30. That is, the bottom surface of the first removing device 601 and the bottom surface of the first bean collecting-and-guiding device 701 are not in contact with the first surface 301. In other embodiments, the bottom surface of the first bean collecting-and-guiding device 701 may flexibly move up and down to maintain a bound contact with the first surface 301, and the friction between the bottom surface of the first bean collecting-and-guiding device 701 and the rotating platform 30 is not enough to hinder the rotation of platform 30. In addition, the first removing device 601 is arranged in front of the second image-capturing device 22 when viewed from the rotation direction of the platform 30, that is, the beans 100 rotating clockwise with the platform 30 (top view) firstly pass through the second image-capturing device 22 and then arrives at the first removing device 601. Also, the first bean collecting-and-guiding device 701 is arranged in front of the first removing device 601 when viewed from the rotation direction of the platform 30, that is, the beans 100 rotating clockwise with the platform 30 (top view) firstly pass through the first removing device 601 and then arrives at the first bean collecting-and-guiding device 701. Moreover, the extension line of the leading edge, which is closest to the platform 30, of the first removing device 601 intersects with the first arc-shaped row 201. The first removing device 601 is a device that forces the beans 100 to fall out of the platform 30 by applying an external force, such as an air jet device applying with airflow or a push rod device applying with impact, which is not limited in this application. When the beans 100 on the first arc-shaped row 201 passing through the first image-capturing device 21 and the second image-capturing device 22 are found to have the first appearance features such as defective products or beans with predetermined values in size, these beans 100 with the first appearance features will be removed when reaching the intersection position of the extension line of the leading edge of the first removing device 601 and the first arc-shaped row 201, and the beans 100 without the first appearance features will continue to advance to the first bean collecting guiding device 701. In one embodiment, the first bean collecting-and-guiding device 701 is an inverted U-shaped structure used to guide the beans 100 without the first appearance features to the first bean-collecting device. The first bean collecting-and-guiding device 701 has a first retaining wall 7011 and a channel 7012 penetrating the first retaining wall 7011. Once the first bean collecting-and-guiding device 701 is set, the first retaining wall 7011 is aligned with the first arc-shaped row 201 and the channel 7012 is aligned with the second arc-shaped row 202. The width of the first retaining wall 7011 covers only the first arc-shaped row 201. The bottom surface of the first retaining wall 7011 is higher than the first surface 301 of the platform 30 and the distance between the bottom surface of the first retaining wall 7011 and the first surface 301 of the platform 30 is smaller than the minimum particle size of the beans 100. In that case, the beans 100 without the first appearance feature on the first arc-shaped row 201 touch the first retaining wall 7011 due to the rotation of the platform 30 and slide into the first bean-collecting device along the direction of the arrow X1. On the other hand, the channel 7012 allows the beans 100 on the second arc-shaped row 202 to pass through and keep rotating with the platform 30. In other embodiments, the first bean collecting-and-guiding device 701 may be a rectangular structure with only the first retaining wall 7011 suspended above the platform 30 in numerous ways. In that case, the width of the first retaining wall 7011 only covers the first arc-shaped row 201 so that only the beans 100 without the first appearance feature on the first arc-shaped row 201 touch the first retaining wall 7011 due to the rotation of the platform 30 and then slide into the first bean-collecting device along the direction of the arrow X1, and the beans 100 on the second arc-shaped row 202 are not hindered by the first retaining wall 7011 and continue to move forward. In other embodiments, the beans 100 without the first appearance feature may be removed when they reach the intersection position of the extension line of the leading edge of the first removing device 601 and the first arc-shaped row 201, while the beans 100 with the first appearance feature may proceed to the first bean collecting-and-guiding device 701.

Still referring to FIG. 5 to FIG. 7, in this embodiment, the second removing device 602 and the second bean collecting-and-guiding device 702 are adjacently arranged to be on top of the first surface 301 of the platform 30. That is, the bottom surface of the second removing device 602 and the bottom surface of the second bean collecting-and-guiding device 702 are not in contact with the first surface 301. In other embodiments, the bottom surface of the second bean collecting-and-guiding device 702 may flexibly move up and down to maintain a bound contact with the first surface 301, and the friction between the bottom surface of the second bean collecting-and-guiding device 702 and the rotating platform 30 is not enough to hinder the rotation of platform 30. In addition, the second removing device 602 is arranged in front of the first bean collecting-and-guiding device 701 when viewed from the rotation direction of the platform 30, that is, the beans 100 rotating clockwise with the platform 30 (top view) firstly pass through the first bean collecting-and-guiding device 701 and then arrives at the second removing device 602. Also, the second bean collecting-and-guiding device 702 is arranged in front of the second removing device 602 when viewed from the rotation direction of the platform 30, that is, the beans 100 rotating clockwise with the platform 30 (top view) firstly pass through the second removing device 602 and then arrives at the second bean collecting-and-guiding device 702. Moreover, the extension line of the leading edge, which is closest to the platform 30, of the second removing device 602 intersects with the second arc-shaped row 202. The second removing device 602 is a device that forces the beans 100 to fall out of the platform 30 by applying an external force, such as an air jet device applying with air flow or a push rod device applying with impact, which is not limited in this application. The beans 100 on the second arc-shaped row 202 which have passed through the first image-capturing device 21 and the second image-capturing device 22 and are found to have the first appearance features such as defective products or beans with predetermined values in size will not be removed at the same time as the removal of the beans 100 with the first appearance features on the first arc-shaped row 201. This is to avoid interference with the removal of the beans 100 with the first appearance features on the first arc-shaped row 201. The beans 100 with the first appearance feature on the second arc-shaped row 202 will firstly pass through the channel 7012 of the first bean collecting-and-guiding device 701 and then be removed when reaching the intersection position of the extension line of the leading edge of the second removing device 602 and the second arc-shaped row 202, and the beans 100 on the second arc-shaped row 202 without the first appearance features will continue to advance to the second bean collecting-and-guiding device 702. In one embodiment, the second bean collecting-and-guiding device 702 is a rectangular structure with a second retaining wall 7021 to guide the beans 100 without the first appearance features to the second bean-collecting device. Once the second bean collecting-and-guiding device 702 is set, the second retaining wall 7021 is aligned with the second arc-shaped row 202 and the width of the second retaining wall 7021 covers only the second arc-shaped row 202. The bottom surface of the second retaining wall 7021 is higher than the first surface 301 of the platform 30 and the distance between the bottom surface of the second retaining wall 7021 and the first surface 301 of the platform 30 is smaller than the minimum particle size of the beans 100. In that case, the beans 100 without the first appearance feature on the second arc-shaped row 202 touch the second retaining wall 7021 due to the rotation of the platform 30 and slide into the second bean-collecting device along the direction of the arrow X2. In other embodiments, the beans 100 without the first appearance feature may be removed when they reach the intersection position of the extension line of the leading edge of the second removing device 602 and the second arc-shaped row 202, while the beans 100 with the first appearance feature may proceed to the second bean collecting-and-guiding device 702.

Figure 9:
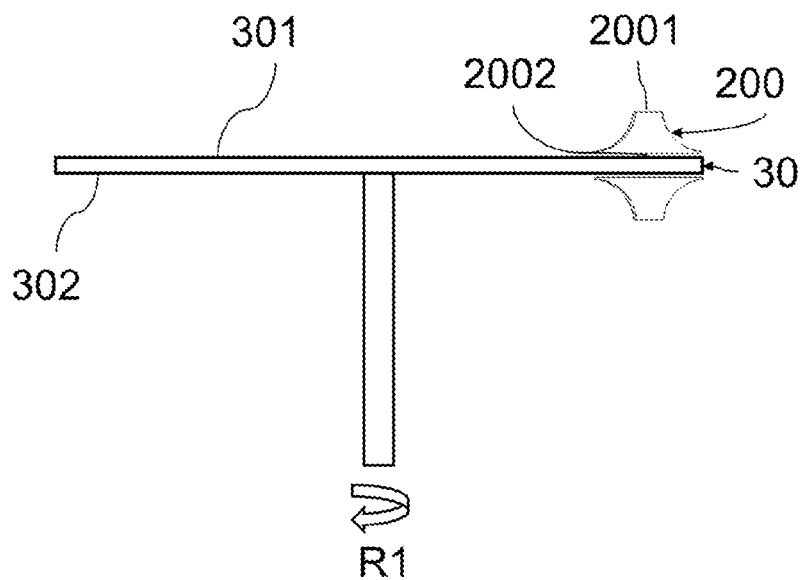
FIG. 9 is a schematic view showing the positional relationship between the auxiliary device for bean dust removal and the platform in one embodiment of the device in FIG. 4.
Figure 10:
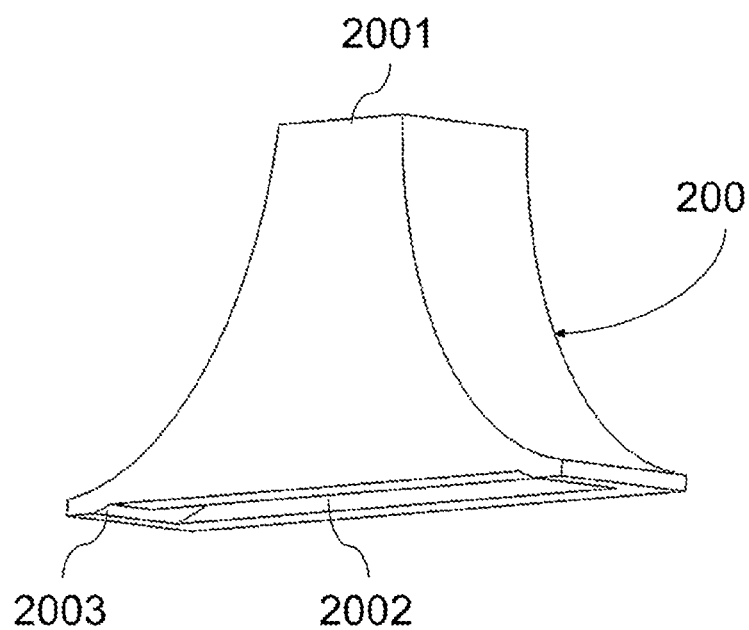
FIG. 10 is an enlarged three-dimensional schematic view of the auxiliary device in FIG. 9 for bean dust removal.

FIG. 9 is a schematic view showing the positional relationship between the auxiliary device for bean dust removal and the platform in one embodiment of the device in FIG. 4. FIG. 10 is an enlarged three-dimensional schematic view of the auxiliary device in FIG. 9 for bean dust removal. As shown in FIGS. 4, 9, and 10, a dust suction auxiliary device 200 connecting with a dust suction hose to suck the bean dust on the first surface 301 or the second surface 302 of the platform 30 may be provided above the first surface 301 or below the second surface 302 of the platform 30. The effect of the dust suction auxiliary device 200 is to prevent the bean selection and collection from being affected by the bean dust and prevent human bodies from being allergic. As shown in FIG. 4, the dust suction auxiliary device 200 may be arranged only above the first surface 301 or only below the second surface 302 or both above the first surface 301 and below the second surface 302 without hindering the arrangement of other devices. As shown in FIG. 9, in one embodiment, the two ends (such as the upper end and the lower end) of the dust suction auxiliary device 200 are respectively formed with a first opening 2001 and a second opening 2002. The first opening 2001 is used to connect with a dust suction hose (not shown), and the second opening 2002 is positioned to face the first surface 301 or the second surface 302. As shown in FIGS. 4 and 10, the junction of the body of the dust suction auxiliary device and the second opening 2002 is formed with a notch 2003 which is to face the rotation direction (for example, along a clockwise direction) of the platform 30 and is distant from the surface of the platform 30 with a gap preferably less than 1 millimeter (mm). This gap allows the bean dust on the platform 30 to enter the inner space of the dust suction auxiliary device 200. In one embodiment, the end surface of the second opening 2002 may contact the first surface 301 or the second surface 302 and no gap exists, so that the area covered by the second opening 2002 may be in a slightly negative pressure environment and have better vacuuming effect. Meanwhile, in order to prevent the platform 30 from being scratched by the dust suction auxiliary device 200, the hardness of the material of the dust suction auxiliary device 200 is preferably lower than that of the platform 30. When a vacuum device (not shown) connected to the suction hose is activated, the bean dust on the first surface 301 or the second surface 302 of the rotating platform 30 will enter the dust suction auxiliary device 200 through the notch 2003, pass through the first opening 2001, enter into the suction hose, and finally collected by the vacuum device. In one embodiment, as shown in FIGS. 4, 9, and 10, the body of the dust suction auxiliary device 200 has the shape of an inverted funnel, and the surface is arc-shaped. However, in other embodiments, the body of the dust suction auxiliary device 200 may have other shapes and is not limited herein as long as two ends of the dust suction auxiliary device 200 are respectively the first opening 2001 and the second opening 2002 remains. The bean selection will not be hindered by the bean dust suction because the bean dust suction is either conducted before or after the bean selection.

The device 1000 of automatically selecting beans illustrated in the embodiments as shown in FIG. 4 to FIG. 7 enables the automatic bean selection on two or three arc-shaped rows. Similarly, the automatic bean selection on more than three arc-shaped rows may be accomplished by forming more than three arc-shaped and parallel rows on the rotating platform 30 and correspondingly arranging more than three sets of removing devices and bean collecting-and-guiding devices (a removing device and a bean collecting-and-guiding device are regarded as a set) in each row. In addition, the automatic bean selection in each row may be performed with multiple removals and multiple collections of beans based on more than one appearance feature or multiple degrees of one appearance feature. For example, a first, second and third removal and collection of beans may be performed according to a first appearance feature, a second appearance feature and a third appearance feature. In addition, in addition to the automatic bean selecting device shown in FIG. 4 to FIG. 7, the method shown in FIG. 1 may also be realized by using other types of motion platforms than that as shown in FIG. 4 to FIG. 7, such as the moving platform shown in FIG. 2. In that case, the automatic bean selection on multiple parallel rows can also be completed when the relative relationship between the bean guiding device 50, the first image-capturing device 21, the second image-capturing device 22, the first removing device 601, the second removing device 602, the first bean collecting-and-guiding device 701, and the second bean collecting-and-guiding device 702 respectively arranged around the moving platform remain the same, except that the rotating platform 30 is replaced by the moving platform.

To sum up, the proposed method and device of automatically selecting beans not only enables accurate and fast quality identification for the beans by using the specially designed algorithm applied in the image-capturing device but also performs bean selection on multiple parallel rows at the same time. Therefore, the proposed method and device of automatically selecting beans have the advantage of saving time and effort by saving workforce and shortening the time for automatic bean selection.

Having described at least one of the embodiments of the claimed invention with reference to the accompanying drawings, it will be apparent to those skills that the invention is not limited to those precise embodiments, and that various modifications and variations may be made in the presently disclosed system without departing from the scope or spirit of the invention. Thus, it is intended that the present disclosure covers modifications and variations of this disclosure provided they come within the scope of the appended claims and their equivalents. Specifically, one or more limitations recited throughout the specification may be combined in any level of details to the extent they are described to accomplish the touch display devices.

What is claimed is:

1. A method of automatically selecting beans, comprising:
   dispersing a plurality of beans on at least a first and a second parallel rows on a motion plane, wherein the trajectories of the first row and the second row are curved;
   capturing images of a first part of the beans on the first row and the second row at a first time point;

capturing images of a second part of the beans on the first row and the second row at a second time point later than or the same as the first time point;

determining a plurality of appearance features of the beans on grounds of the first part images and the second part images;

removing beans with or without a first appearance feature selected from the appearance features on the first row at a third time point later than the second time point;

collecting the beans without or with the first appearance feature on the first row at a fourth time point later than the third time point;

removing the beans with or without the first appearance feature on the second row at a fifth time point later than the fourth time point; and collecting the beans without or with the first appearance feature on the second row at a sixth time point later than the fifth time point;

wherein the third time point and the fifth time point are related to the motion speed of the motion plane and the positions of capturing the first part image or the second part image, and the appearance features include surface defects, luster condition, and size differentiation.

2. The method of claim 1, wherein the trajectories of the first row and the second row are concentric arcs.

3. The method of claim 1, wherein the first appearance feature is one of cracks, broken corners, fragments, foreign objects, moldy objects, moth-eaten holes, unripe beans, and conchoidal beans.

4. The method of claim 1, wherein the first appearance feature is one of beans with size greater than a first predetermined value, beans with size smaller than a second predetermined value, and beans with size within a third predetermined range.

5. A device of automatically selecting beans implementing the method of automatically selecting beans of claim 1, comprising:

a platform being connected to a power source to rotate and having a first surface and a second surface facing away from the first surface;

a bean guiding device having two separate and parallel arc-shaped grooves, being fixedly arranged above the platform to guide the beans to form at least a first and a second parallel arc-shaped rows on the first surface of the platform in rotation;

a first image-capturing device having inside with at least a first image-capturing unit, a first light-emitting unit, a first sensing unit, and a first micro-processing unit that are in electrical connection, being fixedly arranged along the periphery of the platform to capture the first image of the beans on the first arc-shaped row and the second arc-shaped row, the first image-capturing device having a first transverse recess to allow the rotating platform to pass through;

a second image-capturing device having inside with at least a second image-capturing unit, a second light-emitting unit, a second sensing unit, and a second micro-processing unit that are in electrical connection, being fixedly arranged along the periphery of the platform to capture the second image of the beans on the first arc-shaped row and the second arc-shaped row, the second image-capturing device having a second transverse recess to allow the rotating platform to pass through;

a first removing device being an air jet device applying with airflow or being a push rod device applying with impact to force the beans to fall out of the platform, being fixedly arranged at one side of the second image-capturing device along the periphery of the platform and on top of the first surface with an extension line of the leading edge of the first removing device being intersected with the first arc-shaped row, the first removing device removes the beans with or without the first appearance feature on the first arc-shaped row;

a first bean collecting-and-guiding device having a first retaining wall and a channel penetrating the first retaining wall, being fixedly arranged at one side of the first removing device along the periphery of the platform, having the first retaining wall being aligned with the first arc-shaped row and having a width cover only the first arc-shaped row, and being used to guide collection of the beans with or without the first appearance feature on the first arc-shaped row;

a second removing device being an air jet device applying with airflow or being a push rod device applying with impact to force the beans to fall out of the platform, being fixedly arranged at one side of the first bean collecting-and-guiding device along the periphery of the platform and on top of the first surface with an extension line of the leading edge of the second removing device being intersected with the second arc-shaped row, the second removing device removes the beans with or without the first appearance feature on the second arc-shaped row; and a second bean collecting-and-guiding device fixedly arranged at one side of the second removing device along the periphery of the platform, having a second retaining wall being aligned with the second arc-shaped row and having a width cover only the second arc-shaped row, and being used to guide collection of the beans with or without the first appearance feature on the second arc-shaped row;

wherein the platform and the bean guiding device are used to perform the step of dispersing the plurality of beans on at least the first and the second parallel rows on the motion plane; the first image-capturing device is used to perform the step of capturing images of the first part of the beans on the first row and the second row at the first time point; the second image-capturing device is used to perform the step of capturing images of the second part of the beans on the first row and the second row at the second time point later than or the same as the first time point; the first removing device is used to perform the step of removing the beans with or without the first appearance feature selected from the appearance features on the first row at the third time point later than the second time point; the first bean collecting-and-guiding device is used to perform the step of collecting the beans without or with the first appearance feature on the first row at the fourth time point later than the third time point; the second removing device is used to perform the step of removing the beans with or without the first appearance feature on the second row at the fifth time point later than the fourth time point; and the second bean collecting-and-guiding device is used to perform the step of collecting the beans without or with the first appearance feature on the second row at the sixth time point later than the fifth time point.

6. The device of claim 5, wherein the two separate and parallel arc-shaped grooves are respectively aligned with the first arc-shaped row and the second arc-shaped row and a space exists between the bean guiding device and the first surface.

7. The device of claim 6, wherein the grooves have the same curvature as the curvature of a circumferential line of the rotating platform.

8. The device of claim 6, wherein the space is smaller than the minimum particle size of the beans.

9. The device of claim 5, wherein the channel is aligned with the second arc-shaped row.

10. The device of claim 5, wherein the bottom surface of the first bean collecting-and-guiding device or the second bean collecting-and-guiding device is higher than the first surface.

11. The device of claim 5, wherein the distance between the first retaining wall and the first surface or between the second retaining wall and the first surface is smaller than the minimum particle size of the beans.

12. The device of claim 5, wherein the first image-capturing unit positioned below the second surface, and the second image-capturing unit positioned above the first surface.

13. The device of claim 5, wherein the surface of the first transverse recess facing the first surface is white, and the surface of the second transverse recess facing the second surface is white.

14. The device of claim 5, further comprising:
a dust suction auxiliary device having a first opening and a second opening with the first opening being connected with a dust suction hose and with the second opening being arranged to face the first surface or the second surface, being formed with a notch at the junction of the body of the dust suction auxiliary device and the second opening, and being provided above the first surface or below the second surface to suck the dust of the beans on the first surface or the second surface through the notch.

15. The device of claim 5, further comprising:
a bean dispersing device having a dispersing plate and a dispersing guide rail connected to each other and being fixedly arranged along the periphery of the platform and located behind the bean guiding device, wherein the dispersing guide rail is formed with an open end at the end and a partition wall in the center to create two parallel linear tracks, and the open end is located above the first surface and aligned with one end of the bean guiding device.

16. The device of claim 15, wherein the bean dispersing device is connected with a vibrator generating a vibration to move the beans from the dispersing plate to the dispersing guide rail.

17. The device of claim 15, further comprising:
a bean converging device having openings at two ends and being arranged above the bean dispersing device to gather the beans into the dispersing plate, wherein one of the openings is used to receive the beans while the other one of the openings is aligned with the dispersing plate.

* * * * *